United States Patent
Hosoda et al.

(10) Patent No.: US 7,310,117 B2
(45) Date of Patent: Dec. 18, 2007

(54) VIDEO SIGNAL FORMAT SECONDARY-CONVERSION METHOD, TIME CODE SIGNAL TRANSMISSION METHOD, AND TIME CODE TRANSMITTING APPARATUS

(75) Inventors: Takaharu Hosoda, Osaka (JP); Katsuji Uro, Neyagawa (JP); Yukio Shimamura, Hirakata (JP); Masaji Ueno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 585 days.

(21) Appl. No.: 10/508,051

(22) PCT Filed: Mar. 13, 2003

(86) PCT No.: PCT/JP03/02977

§ 371 (c)(1),
(2), (4) Date: Sep. 17, 2004

(87) PCT Pub. No.: WO03/079685

PCT Pub. Date: Sep. 25, 2003

(65) Prior Publication Data

US 2005/0162546 A1    Jul. 28, 2005

(30) Foreign Application Priority Data

Mar. 19, 2002   (JP) .......................... 2002-076104

(51) Int. Cl.
*H04N 13/00*   (2006.01)
(52) U.S. Cl. ..................... 348/441; 348/513
(58) Field of Classification Search ............... 348/441, 348/459, 554, 513; 375/240.26, 240.28; 386/55
See application file for complete search history.

(56) References Cited

U.S. PATENT DOCUMENTS

| | | | | |
|---|---|---|---|---|
| 5,329,309 A | * | 7/1994 | Dorricott et al. ............. | 348/97 |
| 5,459,585 A | * | 10/1995 | Owashi et al. .............. | 358/444 |
| 5,574,506 A | * | 11/1996 | Rhodes ........................ | 348/459 |
| 5,734,435 A | * | 3/1998 | Wilson et al. .............. | 348/459 |
| 5,930,445 A | * | 7/1999 | Peters et al. .................. | 386/52 |
| 5,956,090 A | * | 9/1999 | Yamauchi ................... | 348/441 |
| 2003/0031461 A1 | * | 2/2003 | Takayama .................... | 386/52 |

FOREIGN PATENT DOCUMENTS

| | | |
|---|---|---|
| JP | 2001-45437 | 2/2001 |
| WO | WO 95/21505 | 8/1995 |

OTHER PUBLICATIONS

Japanese Office Action issued in corresponding Japanese Patent Application No. JP 2002-076104, dated Oct. 3, 2006.

* cited by examiner

*Primary Examiner*—Victor R. Kostak
(74) *Attorney, Agent, or Firm*—McDermott Will & Emery LLP

(57) ABSTRACT

When a time code signal corresponding to an image signal, to which a format conversion changing the number of frames per second is executed, is transmitted, information indicating a frame position where image data is changed through the format conversion in the image signal is attached to the time code signal to be transmitted. Alternatively, information indicating a synchronous state between frame conversion cycles in the format conversion and time code progression is attached to the time code signal. In the foregoing manner, a relationship between the frame position and the time code can be accurately grasped. Further, a secondary conversion (inverse conversion) is accurately executed to the image signal by means of the time code signal.

20 Claims, 4 Drawing Sheets

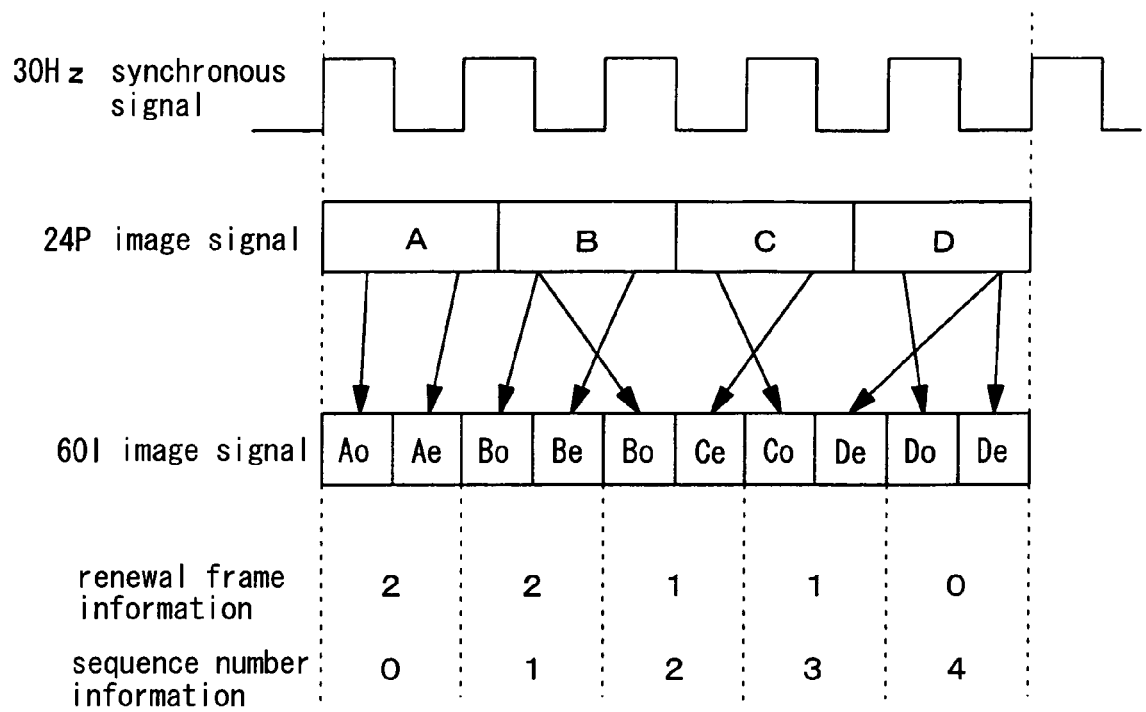
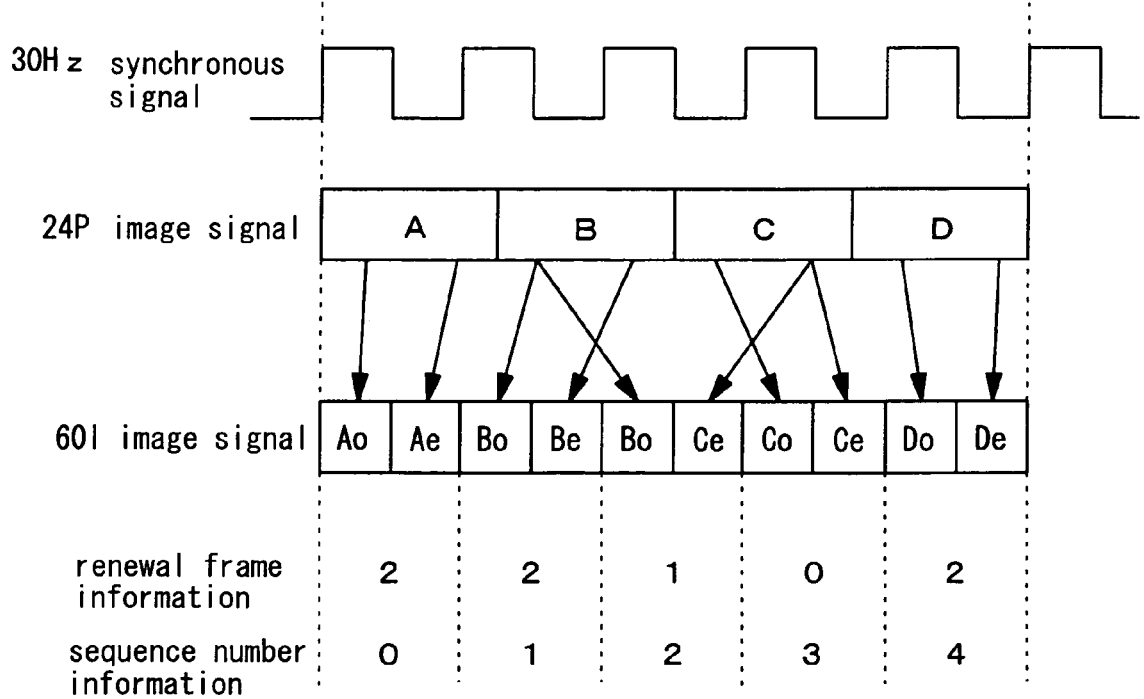

VIDEO SIGNAL FORMAT SECONDARY-CONVERSION METHOD, TIME CODE SIGNAL TRANSMISSION METHOD, AND TIME CODE TRANSMITTING APPARATUS

TECHNICAL FIELD

The present invention relates to a format secondary conversion method for an image signal, and a method and an apparatus for transmitting a time code signal used for the format secondary conversion method for the image signal.

BACKGROUND OF THE INVENTION

As a time code signal used for transmitting an image signal, LTC (Linear Time Code) signal subjected to a Biphasemark modulation and recorded in an audio frequency band can be mentioned. The time code signal is transmitted in a synchronous state with respect to the image signal.

The advancement in an image technology in recent years has realized a format conversion of the image signal. In general, when the format conversion is executed, the number of frames per second is increased or decreased. More specifically, the format conversion processing results in increasing or decreasing the number of image data (hereinafter, referred to as frame image data) per second constituting the respective frames in the image signal. Therefore, at least one frame image data of the respective frame image data constituting the image signal prior to the conversion is consequently eliminated or written in an overlapping state in the converted image signal.

When the format conversion is executed to the image signal, the image signal is inversely converted into a format prior to the conversion as circumstances demand. Hereinafter, the initial format conversion is called a primary conversion, and the format conversion for inverting the primary-converted image signal into the original image signal is called a secondary conversion.

In order to accurately secondary-convert the primary-converted image signal into the original image signal, it becomes necessary that the respective frames in the primary-converted image signal and the respective frames in the secondary-converted image signal accurately correspond to each other. In order to make them accurately correspond to each other, it is important to accurately grasp a frame position where any change is generated in the image data in the primary-converted image signal at the time of executing the secondary conversion (inverse conversion).

However, a conventional technology has neither established any configuration where a relationship between the frame position and the time code signal can be accurately grasped nor proposed any effective method in the time code signal corresponding to the primary-converted image signal.

Therefore, a main object of the present invention is to accurately grasp the relationship between the frame position and the time code signal in the image signal, which is subjected to the time of the primary conversion, to thereby accurately execute the format secondary conversion to the image signal.

DISCLOSURE OF THE INVENTION

In order to accomplish the foregoing object, a first time code signal transmission method according to the present invention is a time code signal transmission method for transmitting a time code signal corresponding to an image signal after a format conversion, in which the number of frames per second is changed, is executed thereto, wherein information indicating a frame position in the image signal, where image data is changed through the format conversion, is attached to the time code signal to be transmitted.

A first time code signal transmission apparatus according to the present invention is a time code signal transmission apparatus for transmitting the time code signal corresponding to the image signal after the format conversion, in which the number of frames per second is changed, is executed thereto, comprises a creation device, the creation device creating the information indicating the frame position in the image signal where the image data is changed through the format conversion, and an attachment device, the attachment device attaching the information to the time code signal to be transmitted.

A second time code signal transmission method according to the present invention is a time code signal transmission method for transmitting a time code signal corresponding to an image signal after a format conversion, in which the number of frames per second is changed, is executed thereto, wherein information indicating a synchronous state between frame conversion cycles in the format conversion and time code progression is attached to the time code signal to be transmitted.

A second time code signal transmission apparatus according to the present invention is a time code signal transmission apparatus for transmitting a time code signal corresponding to the image signal after the format conversion, in which the number of frames per second is changed, is executed thereto, comprises a creation device, the creation device creating the information indicating the synchronous state between the frame conversion cycles in the format conversion and the time code progression and an attachment device, the attachment device attaching the information to the time code signal to be transmitted in response to the time code progression.

A first format secondary conversion method for image signal according to the present invention is a format secondary conversion method for an image signal for reconverting the primary-converted image signal after a format primary conversion, in which the number of frames per second is changed, is executed thereto through a secondary conversion (inverse conversion) to the image signal of an original format, wherein the information indicating the frame position in the primary-converted image signal, in which the image data is changed through the format primary conversion, is attached to the time code signal corresponding to the image signal after the format primary conversion, the information indicating the frame position is retrieved from the time code signal when the primary-converted image signal is subjected to the secondary conversion, and the primary-converted image signal is secondary-converted into the image signal of the original format based on the retrieved information.

A second format secondary conversion method for image signal according to the present invention is a format secondary conversion method for image signal for restituting the image signal after a format primary conversion, in which the number of frames per second is changed, is executed thereto through a secondary conversion (inverse conversion) to the image signal of an original format, wherein the information indicating the synchronous state between the frame conversion cycles in the format conversion and the time code progression is attached to the time code signal corresponding to the image signal after the format primary conversion, the information indicating the synchronous state is retrieved from the time code signal when the primary-converted image signal is subjected to the secondary conversion, and the primary-converted image signal is secondary-converted into the image signal of the original format based on the retrieved information.

Accordingly, in the present invention, the secondary conversion can be executed with the accurate knowledge of the relationship between the frame position and the time code in the format secondary conversion of the image signal.

In the first time code signal transmission method, first time code signal transmission apparatus, and first format secondary conversion method for image signal according to the present invention, the information preferably represents a field position in the image signal where the image data is changed in the format conversion. In that manner, the secondary conversion can be executed while exactly knowing the relationship between the field position and the time code, and by extension, mutual conversions (primary and secondary conversions) between an interlace image signal and a progressive image signal can be executed with a high accuracy.

The information is preferably attached to a user's bit area of the time code signal.

BRIEF DESCRIPTION OF THE DRAWINGS

FIGS. 2A and 2B are frame formats illustrating a format conversion, in which a 24P image signal is converted into a 60I image signal.

DESCRIPTION OF THE PREFERRED EMBODIMENT

Figure 1:
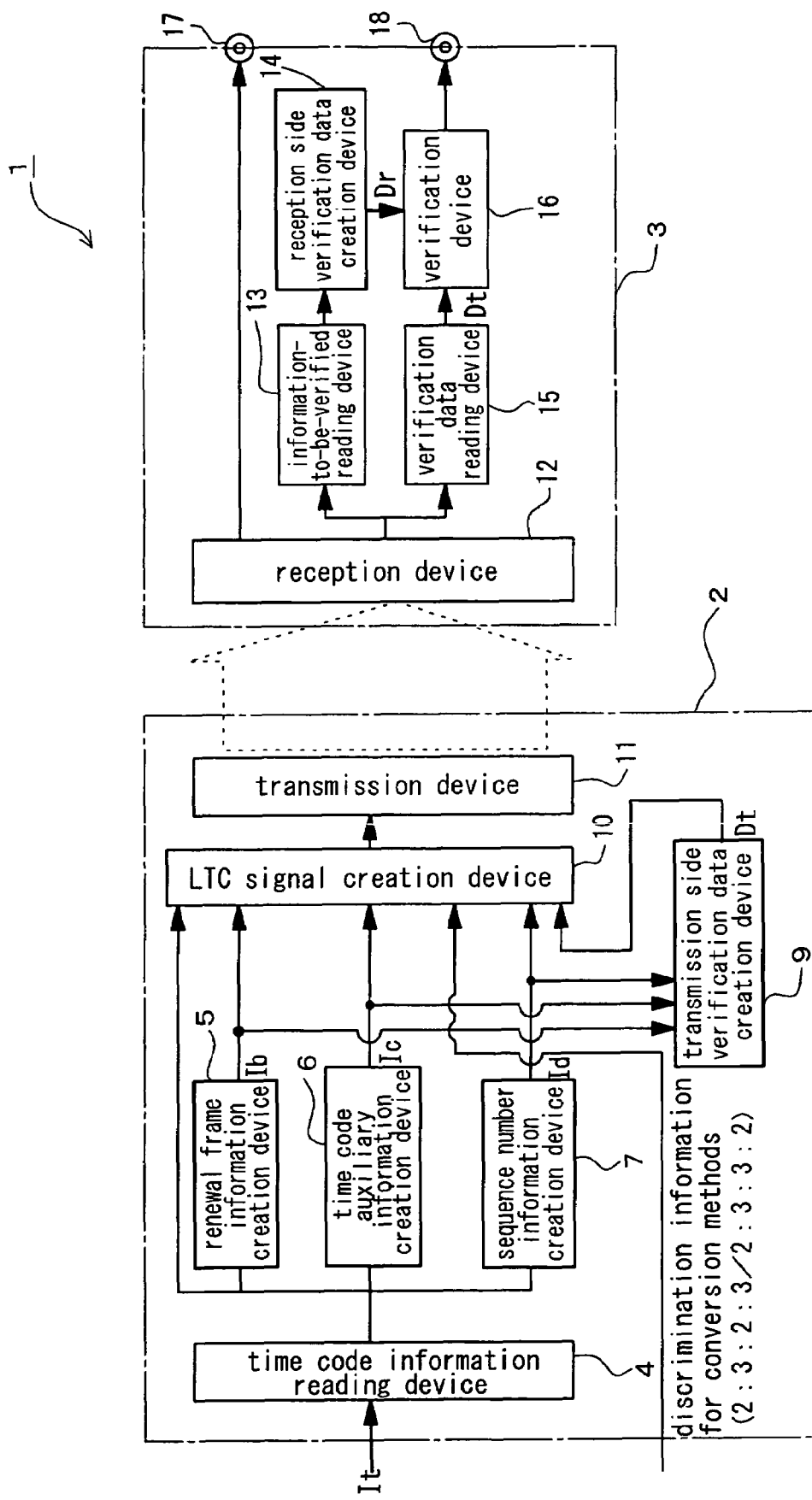
FIG. 1 is a block diagram illustrating a configuration of a time code signal transmission apparatus according to a preferred embodiment of the present invention.

Hereinafter, a preferred embodiment of the present invention is described referring to the drawings. FIG. 1 is a block diagram illustrating a configuration of a time code signal transmission apparatus according to a preferred embodiment of the present invention. The present embodiment is premised on a format conversion of an image signal. In the present embodiment, the invention is realized by means of an apparatus for transmitting a time code signal corresponding to the format-converted image signal. To be more specific, the present embodiment is premised on a primary conversion of an image signal (hereinafter, referred to as 24P image signal) in a progressive format of 24 frames/second (hereinafter, referred to as 24P format) into an image signal (hereinafter, referred to as 60I image signal) in an interlace format of 30 frames/second (hereinafter, referred to as 60I format).

In the present embodiment, the invention is realized by means of a time code signal transmission apparatus 1 for transmitting the time code signal corresponding to the converted image signal (60I image signal) in executing the format primary conversion and a format secondary conversion (inverse conversion) using the transmitted time code.

The time code signal transmission apparatus 1 comprises a transmission unit 2 and a reception unit 3. A configuration of the transmission unit 2 is first described.

The transmission unit 2 comprises a time code information reading device 4, a renewal frame information creation device 5, a time code auxiliary information creation device 6, a sequence number information creation device 7, a transmission side verification data creation device 9, an LTC signal creation device 10, and a transmission device 11.

The time code information reading device 4 reads time code information It created outside of the time code signal transmission apparatus 1. The time code information reading device 4 outputs the read time code information It to the renewal frame information creation device 5, time code auxiliary information creation device 6, sequence number information creation device 7, and LTC signal creation device 10.

The renewal frame information creation device 5, time code auxiliary information creation device 6, and sequence number information creation device 7 create different kinds of attached information Ia from the time code information It read by the time code information reading device 4. The attached information Ia is to be stored in a user's bit area 20 of the LTC signal (time code signal).

The attached information Ia includes renewal frame information Ib, time code auxiliary information Ic, and sequence number information Id. The renewal frame information Ib is created in the renewal frame information creation device 5. The time code auxiliary information Ic includes frame rate information (numeral value information of frame rate) $Ic_1$, interlace/progressive discrimination information $Ic_2$, and other auxiliary information $Ic_3$. The time code auxiliary information Ic including such information is created in the time code auxiliary information creation device 6. The sequence number information Id is created in the sequence number information creation device 7.

The creation devices 5, 6 and 7 output the different kinds of attached information Ia created thereby to the LTC signal creation device 10 and transmission side verification data creation device 9.

The transmission side verification data creation device 9 creates transmission side verification data Dt from the attached information Ia (renewal frame information Ib, time code auxiliary information Ic, and sequence number information Id) inputted therein, and outputs the transmission side verification data Dt to the LTC signal creation device 10. To put it differently, the transmission side verification data creation device 9 uses the attached information Ia inputted therein as the information to be verified to thereby create the transmission side verification data Dt.

The LTC signal creation device 10 creates the LTC signal, which is the time code signal, based on the time code information It, attached information Ia (renewal frame information Ib, time code auxiliary information Ic, and sequence number information Id),and transmission side verification data Dt. The LTC signal creation device 10 outputs the created LTC signal to the transmission device 11. The transmission device 11 transmits the inputted LTC signal to the reception unit 3, in which the transmission method is not particularly limited. The transmission device 11 transmits the LTC signal to the reception unit 3 by means of, for example, cable transmission.

Next, a configuration of the reception unit 3 is described. The reception unit 3 comprises a reception device 12, an information-to-be-verified reading device 13, a reception side verification data creation device 14, a verification data reading device 15, and a verification device 16.

The reception device 12 receives the LTC signal transmitted from the transmission unit 2. The information-to-be-verified reading device 13 reads the attached information Ia from the user's bit area 20 of the received LTC signal, and outputs the attached information Ia to the reception side verification data creation device 14.

The reception side verification data creation device 14 executes a calculation processing using the read attached information Ia based on a predetermined verification formula to thereby create a reception side verification data Dr. The formula used in the reception side verification data creation device 14 employs a verification formula used in the transmission side verification data creation device 9.

The verification data reading device 15 reads the transmission side verification data Dt from the received LTC signal. The verification device 16 collates the transmission side verification data Dt and the reception side verification data Dr to thereby verify if any error is generated in the information in the user's bit area 20 of the received LTC signal.

A reference numeral 17 denotes an LTC signal output terminal serving to output the LTC signal received by the reception device 12 outside from the reception unit 3. A reference numeral 18 denotes a verification result output terminal serving to output the verification result of the verification device 16 outside from the reception unit 3.

In the present embodiment, the renewal frame information creation device 5 constitutes an example of a creation device, the creation device creating information indicating a frame position in the image signal where image data is changed in the format conversion. The sequence number information creation device 7 constitutes an example of a creation device, the creation device creating information indicating a synchronous state between frame conversion cycles and time code progression in the format conversion. The LTC signal creation device 10 constitutes an example of an attachment device.

However, the configuration examples are only part of examples realizing the present invention. The present invention can accept any configuration capable of exerting functions recited in claims.

Next, the attached information Ia is described. The attached information Ia is effective in the following transmission form of the time code signal.

The advancement in an image technology in recent years has realized the format conversion of the image signal. For example, the image signal of the 24P format can be converted into the image signal of the 60I format. In general, the execution of the format conversion increases or decreases the number of the frames per second. More specifically, the format conversion processing increases or decreases the number of the image data (hereinafter, referred to as frame image data) per second constituting the respective frames in the image signal. Therefore, at least one frame image data of the respective frame image data constituting the image signal prior to the conversion is consequently eliminated or written in an overlapping state in the converted image signal.

When the format conversion is executed to the image signal as described, the image signal is inversely converted into the image signal of the format prior to the conversion whenever necessary, a reason for which is mentioned below.

Many of image processing apparatuses generally used, such as a nonlinear edition device, can only execute an image processing of a standard format (for example, 60I format or 30P format). Because of that, when the image signal of the standard format (for example, 60I format or 30P format) is converted into the image signal of a non-standard format, it becomes necessary to inversely convert the image signal into the image signal of the standard format in order to execute the image processing to the image signal by means of the general image processing apparatus.

Further, when the image processing (nonlinear edition) is executed to the image signal converted into the format increasing the number of frames per second, it is effective to inversely convert the image signal into the image signal of the format prior to the conversion for such a reason that the edition of the pre-conversion image format requires a less memory capacity.

In the following description, the inverse conversion is called the secondary conversion and discriminated from the primary conversion initially executed. The image data is comprised of the frame image data sequentially disposed in a chronological order. In the case of an interlace image signal, the frame image data is comprised of a pair of field image data.

In order to accurately restitute the primary-converted image signal (hereinafter, referred to as primary conversion image signal) to the original image signal through the secondary conversion, it is necessary to accurately grasp an arrangement order of the image data in the primary conversion image signal, a reason for which is described below. The reason is described exemplifying the conversion form where the 24P image signal is primary-converted into the 60I image signal and the conversion form where the 10P image signal is primary-converted into the 60I image signal. Needless to say, the reason is applied to the format conversion in other forms.

Figure 3:
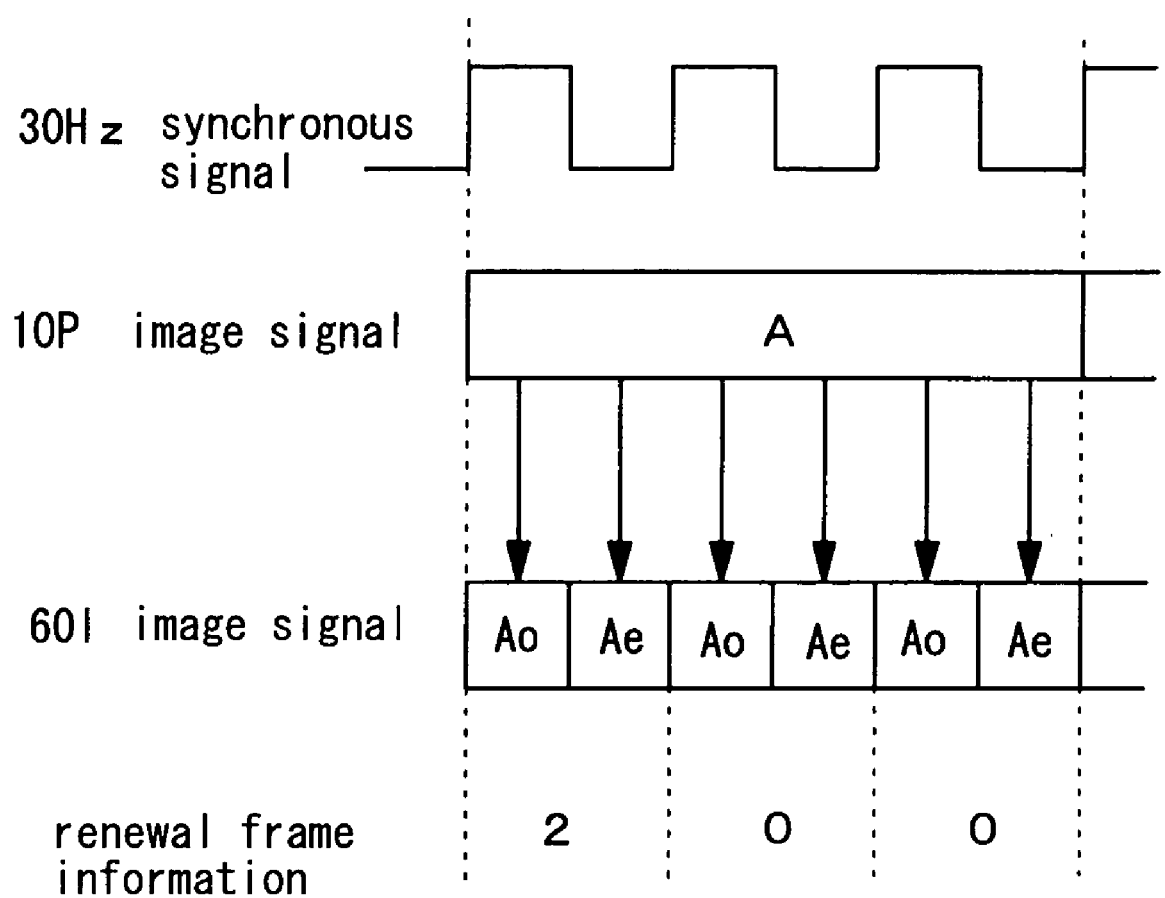
FIG. 3 is a frame format illustrating a format conversion, in which a 10P image signal is converted into the 60I image signal

FIG. 2A and FIG. 2B illustrate the conversion form where the 24P image signal is primary-converted into the 60I image signal. FIG. 3 illustrates the conversion form where the 10P image signal is primary-converted into the 60I image signal.

First, the primary conversion of the 24P image signal into the 60I image signal is described referring to FIG. 2A. FIG. 2A shows a conversion method called a 2:3:2:3 pull-down method. 24P frame image data for four frames temporally consecutive in the 24P image signal is converted into 60I frame image data for five frames, which are increased by one frame through the primary conversion into the 60I image signal.

When the primary conversion (24P→60I) is executed by means of the 2:3:2:3 pull-down conversion method to the image signals having the format-wise differences, the processing is as follows.

First, 24I frame image data (Ao|Ae), (Bo|Be), (Co|Ce), and (Do|De) in a 24I image signal (interlace image signal of 24 frames/second) is retrieved from the frame image data (A), (B), (C), and (D) sequentially disposed on a time axis in the 24P image signal. A symbol o denotes a first field. A symbol e denotes a second field.

Further, the 60I frame image data (Ao|Ae), (Bo|Be), (Bo|Ce), (Co|De), and (Do|De) for five frames in the 60I image signal are created from the retrieved 24I frame image data (Ao|Ae), (Bo|Be), (Co|Ce), and (Do|De). Such a creation (conversion) process is repeated per four frames of the 24P format to thereby primary-convert the 24P image signal into the 60I image signal.

At that time, of the respective 24I field image data (Ao), (Ae), (Bo), (Be), (Co), (Ce), (Do), and (De) constituting the retrieved 24I frame image data (Ao|Ae), (Bo|Be), (Co|Ce), and (Do|De), two 24I field image data (Bo) and (De), which makes one frame in sum total, are redundantly used. The 24I field image data (Bo) and (De) to be redundantly used and insertion positions thereof are determined in advance. Further, arrangement positions of the respective 24I field image data (Ao), (Ae), (Bo), (Be), (Co), (Ce), (Do), and (De) including the 24I field image data (Bo) and (De) redundantly used are also determined in advance. In FIG. 2A, the insertion and arrangement order is shown. Hereinafter, such a rearrangement order in the primary conversion is called a primary conversion order.

The conversion method called the 2:3:2:3 pull-down conversion method was described referring to FIG. 2A. There is another conversion method called a 2:3:3:2 pull-down conversion method, as shown in FIG. 2B, that can be employed when the 24P image signal is primary-converted into the 60I image signal. In the 2:3:3:2 pull-down conversion method, two 24I field image data (Bo) and (Ce) are redundantly used. The 24I field image data (Bo) and (Ce) redundantly used and insertion positions thereof are determined in advance. Further, arrangement positions of the respective 24I field image data (Ao), (Ae), (Bo), (Be), (Co), (Ce), (Do), and (De) including the 24I field image data (Bo) and (Ce) redundantly used are determined in advance. In FIG. 2B, the insertion and arrangement order is shown. As shown in FIG. 2B, the 2:3:3:2 pull-down conversion method is only slightly different to the 2:3:2:3 pull-down conversion method in the field combinations at the time of the conversion.

Next, the primary conversion of the 10P image signal into the 60I image signal is described. 10I frame image data for one frame in the 10P image signal is converted into the 60I frame image data for three frames, which are increased by two frames through the primary conversion into the 60I image signal.

To be specific, first, frame image data (Ao|Ae) in the 10I image signal (interlace image signal of ten frames/second) is retrieved from respective 10P frame image data (A) in the 10P image signal.

Further, the 60I frame image data (Ao|Ae), (Ao|Ae), and (Ao|Ae) for three frames in the 60I image signal are created from the retrieved 10I frame image data (Ao|Ae). To be specific, the 60I frame image data (Ao|Ae), (Ao|Ae), and (Ao|Ae) for three frames are created by repeatedly copying the same 10I frame image data (Ao|Ae) for three frames. Such a creation (conversion) process is repeated per frame of the 10P format to thereby primary-convert the 10P image signal into the 60I image signal. FIG. 3 shows the insertion and arrangement order.

In order to accurately secondary-convert the various primary conversion image signals described above into the original image signals, it is necessary that the respective frames in the primary conversion image signal and the respective frames in the secondary-converted image signal accurately correspond to each other. In order to make them accurately correspond to each other, it is important to accurately grasp the frame position where the image data changes in the primary-converted image signal when the secondary conversion is executed.

In the time code signal transmission apparatus 1 for transmitting the time code signal corresponding to the primary conversion image signal (hereinafter, referred to as primary conversion time code signal) according to the present embodiment, the following attached information Ia is attached to the user's bit area 20 of the time code signal to be transmitted. The user's bit area 20, which is also called a binary group, is set to 32 bits of 64 data bits of a SMPTE/EBU time code signal.

The time code signal transmission apparatus 1 designates the information indicating the frame position where the image data changes through the primary conversion as the renewal frame information Ib, and attaches the renewal frame information Ib thus designated to the user's bit area 20 of the primary conversion time code signal. The renewal frame information is an example of the information indicating the frame position where the image data is changed through the format conversion in the image signal.

The renewal frame information Ib is created in response to the interlace format, for example, in the following manner. When the image data is changed in the first field of the frame, the renewal frame information Ib (2) is attached to the user's bit area 20 of the primary conversion time code signal corresponding to the relevant frame. When the image data is changed in the second field of the frame, the renewal frame information Ib (1) is attached to the user's bit area 20 of the primary conversion time code signal corresponding to the relevant frame. When the image data is not changed in the frame, the renewal frame information Ib (0) is attached to the user's bit area 20 of the primary conversion time code signal corresponding to the relevant frame.

The primary conversion image signal is accurately secondary-converted by using the primary conversion time code signal with the renewal frame information Ib corresponding to the primary conversion states of the respective frames attached thereto.

First, below are described an function exerted by the renewal frame information Ib and an operation of the secondary conversion using the same exemplifying the case where the image signal, in which the 24P image signal is primary-converted into the 60I image signal, is restituted to the 24P image signal through the secondary conversion. The operation of the secondary conversion is described here exemplifying the 2:3:2:3 pull-down conversion method.

As shown in FIG. 2A, the following change is generated in the primary-converted 60I image signal. In the frame (Ao|Ae), the image data changes in the first field with respect to a previous frame (not shown). In the frame (Bo|Be), the image data changes in the first field with respect to the previous frame (Ao|Ae). In the frame (Bo|Ce), the image data changes in the second field with respect to the previous frame (Bo|Be). In the frame (Co|De), the image data changes in the second field with respect to the previous frame (Bo|Ce). In the frame (Do|De), the image data does not change respect to the previous frame (Co|De).

Based on the foregoing changes of the image data, the following renewal frame information Ib is attached to the time code signal (LTC signal) corresponding to the primary conversion image signal (60I image signal) in the time code signal transmission apparatus 1. The renewal frame information Ib (2) is attached to the use's bit area 20 of the time code signal corresponding to the respective frames (Ao|Ae) and (Bo|Be). The renewal frame information Ib (1) is attached to the use's bit area 20 of the time code signal corresponding to the respective frames (Bo|Ce) and (Co|De). The renewal frame information Ib (0) is attached to the use's bit area 20 of the time code signal corresponding to the frame (Do|De).

The numeral values in the brackets attached to the respective frame information Ib denote the following. (2) denotes that the frame image data is created in the secondary conversion using the image signals in the first and second fields constituting the frame because the image data is changed in the first field in the relevant frame.

(1) denotes that the frame image data is created in the secondary conversion using the field image data in the second field constituting the frame and the field image data in the first field of the next frame because the image data is changed in the second field in the relevant frame.

(0) denotes that it is unnecessary to create the frame image data from the field image data constituting the frame in the secondary conversion because the image data is not changed in the relevant frame with respect to the previous frame.

As above, the operation of the secondary conversion was described exemplifying the 2:3:2:3 pull-down conversion method. Needless to say, the operation of the secondary conversion is executed in the same manner when the 2:3:3:2 pull-down conversion method is employed.

When the primary conversion image signal (60I image signal) is secondary-converted into the 24P image signal by means of the renewal frame information Ib attached to the time code signal, the following processing is executed to the primary conversion image signal (60I image signal).

In the frame (Ao|Ae), the frame image data (A) of the 24P image signal is created from the field image data (Ao) in the first field where the image data is changed and the second field image data (Ae) that temporally follows. The creation of the frame image data (A) is based on the reading of the renewal frame information Ib (2) attached to the user's bit area 20 of the time code signal corresponding to the relevant frame.

In the frame (Bo|Be), the frame image data (B) of the 24P image signal is created from the field image data (Bo) in the first field where the image data is changed and the second field image data (Be) that temporally follows. The creation of the frame image data (B) is based on the reading of the renewal frame information Ib (2).

In the frame (Bo|Ce), the frame image data (C) of the 24P image signal is created from the field image data (Ce) in the second field where the image data is changed and the first field image data (Co) of the frame (Co|De) that temporally follows. The creation of the frame image data (C) is based on the reading of the renewal frame information Ib (1).

In the frame (Co|De), the frame image data (D) of the 24P image signal is created from the field image data (De) of the second field where the image data is changed and the first field image data (Do) of the frame, (Do|De) that temporally follows. The creation of the frame image data (D) is based on the reading of the renewal frame information Ib (1).

In the frame (Do|De), the frame image data of the 24P image signal is not created from the image data of the relevant frame. The non-creation of the frame image data is based on the reading of the renewal frame information Ib (0).

The primary conversion image signal (60I image signal) is accurately secondary-converted into the 24P image signal through the secondary conversion described above.

Next, the content of the renewal frame information Ib and the operation of the secondary conversion referring to the case where the image signal, in which the 10P image signal is primary-converted into the 60I image signal, is restituted to the 10P image signal through the secondary conversion.

As shown in FIG. 3, the following change is generated in the image data in the primary conversion image signal (60I image signal). In the first frame (Ao|Ae), the image data is changed in the first field with respect to a previous frame (not shown). In the second and third frames (Ao|Ae) and (Ao|Ae), the image data is not changed with respect to the previous frames.

Based on the changes of the image data, in the time code signal transmission apparatus 1, the following renewal frame information Ib is attached to the user's bit area 20 of the time code signal corresponding to the primary conversion image signal (60I image signal). The renewal frame information Ib (2) is attached to the user's bit area 20 of the time code signal corresponding to the first frame (Ao|Ae). The renewal frame information Ib (0) is attached to each user's bit area 20 of the time code signal corresponding to the second and third frames (Ao|Ae) and (Ao|Ae).

When the primary conversion image signal (60I image signal) is secondary-converted into the 10P image signal using the renewal frame information Ib attached to the time code signal, the following processing is executed to the primary conversion image signal (60I image signal).

In the first frame (Ao|Ae), the 10P frame image data (A) is created from the field image data (Ao) in the first field where the image data is changed and the second field image data (Ae) that temporally follows based on the reading of the renewal frame information Ib (2) attached to the user's bit area 20 of the time code signal corresponding to the relevant frame. In the second and third frames (Ao|Ae) and (Ao|Ae), the frame image data is not created from the image data of the relevant frames based on the reading of the renewal frame information Ib (0).

The execution of the described secondary conversion enables the primary conversion image signal (60I image signal) to be accurately secondary-converted into the 10P image signal.

In order to execute the foregoing secondary conversion using the renewal frame information Ib, it is necessary to create a conversion frequency signal of the primary conversion image signal. The conversion frequency signal represents cycles when the image data is changed in converting the original image signal into the primary conversion image signal. When the 24P image signal is primary-converted into the 60I image signal, the conversion frequency signal shows five frame cycles. When the 10P image signal is primary-converted into the 60I image signal, the conversion cycle signal shows three frame cycles. The conversion cycle signal can be created based on the renewal frame information Ib attached to the time code signal on the side of the apparatus for executing the secondary conversion (image processing apparatus). The conversion cycle signal can be created based on the renewal frame information Ib in the following manner. The renewal frame information Ib repeats the data in accordance with the conversion cycles in the primary conversion, and the repetition cycles are detected to thereby create the conversion cycle signal.

In the time code signal transmission apparatus 1 according to the present embodiment, another attached information Ia is attached to the user's bit area 20 of the time code signal. When the 24P image signal is primary-converted into the 60I image signal or 30P image signal, or the like, a cyclic sequence, in which five frames of the primary conversion image signal (60I image signal, 30P image signal) constitute a cycle, is repeatedly executed. The cyclic sequence is called, as described earlier, the 2:3:2:3 pull-down processing or the 2:3:3:2 pull-down processing. FIG. 2A and FIG. 2B are referenced for the details of the pull-down processings.

In the primary conversion image signal, to which the pull-down processings are implemented, the same primary conversion processing is repeated implemented per five frames. When it is accurately known which cyclic position in the five frame cycles the respective frames in the primary conversion image signal (60I image signal, 30P image signal) correspond to, the primary conversion image signal can be accurately secondary-converted. In the time code signal transmission apparatus 1 according to the present embodiment, therefore, five sequence number information Id (00), (01), (02), (03), (04) are sequentially attached to the time code signal corresponding to the primary conversion image signal (60I image signal and 30P image signal) in response to the respective frame positions.

More specifically, the sequence number information Id (00 01 02 03 04 00 01 02 03 04 . . . ) is created in response to values of frame digits (00 01 02 03 04 05 06 07 08 09 10 11 . . . 27 28 29 00 . . . ) of the time code in the primary conversion image signal (60I image signal, 30P image signal). The created sequence number information Id is arranged to correspond to the respective frame positions of the time code signal, and attached to the user's bit area 20 of the time code signal in the corresponding state.

The sequence number information Id can be calculated as a remainder of an integral number 5 into the frame digit values of the time code. The calculation method results from the respective pull-down processings, in which the format conversion processing is repeated per five frames.

In the primary conversion image signal (60I image signal), the sequence number information Id has the following principal purpose. In the respective frames of the primary conversion image signal (60I image signal) corresponding to the sequence number information Id (00) and Id (01), the image data is changed in the field image data in the first field. In the respective frames of the primary conversion image signal (60I image signal) corresponding to the sequence number information Id (02) and Id (03), the image data is changed in the field image data in the second field. In the respective frames of the primary conversion image signal (60I image signal) corresponding to the sequence number information Id (04), the image data is not changed in any field image data in either of the fields. The sequence number information ID is an example of the information indicating the synchronous state between the frame conversion cycles in the format conversion and the time code progression.

When the primary conversion image signal (60I image signal) is secondary-converted into the 24P image signal using the time code signal with the sequence number information Id having the purpose attached thereto, the following processing is executed to the primary conversion image signal (60I image signal).

In the frame (Ao|Ae), the following processing is executed based on the reading of the sequence number information Id (00) attached to the user's bit area 20 of the time code signal corresponding to the relevant frame position. The frame image data (A) is created from the field image data (Ao) in the first field of the frame where the image data is changed and the second field image data (Ae) that temporally follows.

In the frame (Bo|Be), the following processing is executed based on the reading of the sequence number information Id (01) attached to the user's bit area 20 of the time code signal corresponding to the relevant frame position. The frame image data (B) is created from the field image data (Bo) in the first field of the frame where the image data is changed and the second field image data (Be) that temporally follows.

In the frame (Bo|Ce), the following processing is executed based on the reading of the sequence number information Id (02) attached to the user's bit area 20 of the time code signal corresponding to the relevant frame position. The frame image data (C) is created from the field image data (Ce) in the second field of the frame where the image data is changed and the first field image data (Co) in the frame (Co|De) that temporally follows.

In the frame (Co|De), the following processing is executed based on the reading of the sequence number information Id (03) attached to the user's bit area 20 of the time code signal corresponding to the relevant frame position. The frame image data (D) is created from the field image data (De) in the second field of the frame where the image data is changed and the first field image data (Do) in the frame (Do|De) that temporally follows.

In the frame (Do|De), the frame image data is not created from the image data of the frame (Do|De) based on the reading of the sequence number information Id (04) attached to the user's bit area 20 of the time code signal corresponding to the relevant frame position.

The foregoing secondary conversion is executed to thereby accurately secondary-convert the primary-converted 60I image signal into the 24P image signal.

When the 24P image signal is converted into the 30P image signal through the primary conversion, and the 30P image signal is inversely converted into the 24P image signal through the secondary conversion, the respective pull-down processings are basically implemented, as described. The sequence number information Id is thus effective. Therefore, when the secondary conversion is executed to the primary conversion image signal (30P image signal) based on the sequence number information Id, the 30P image signal can be accurately restituted to the 24P image signal.

The sequence number information Id is, as described, the auxiliary information, which becomes effective in the secondary conversion (60I image signal→24P image signal, 30P image signal→24P image signal) of the image signal subjected to the respective pull-down processings in the primary conversion (24P image signal→60I image signal, 24P image signal→30P image signal). Therefore, the sequence number information Id is not effective in the secondary conversion of the image signal which is not subjected to the respective pull-down processings in the primary conversion (10P image signal→60I image signal). Because of that, the sequence number information Id is not provided for the time code signal to be attached to the primary conversion image signal, which is not subjected to the respective pull-down processings in the primary conversion. In that case, information of NO INFO (for example, Fh in hexadecimal notation) is attached to the user's bit area 20.

Figure 4:
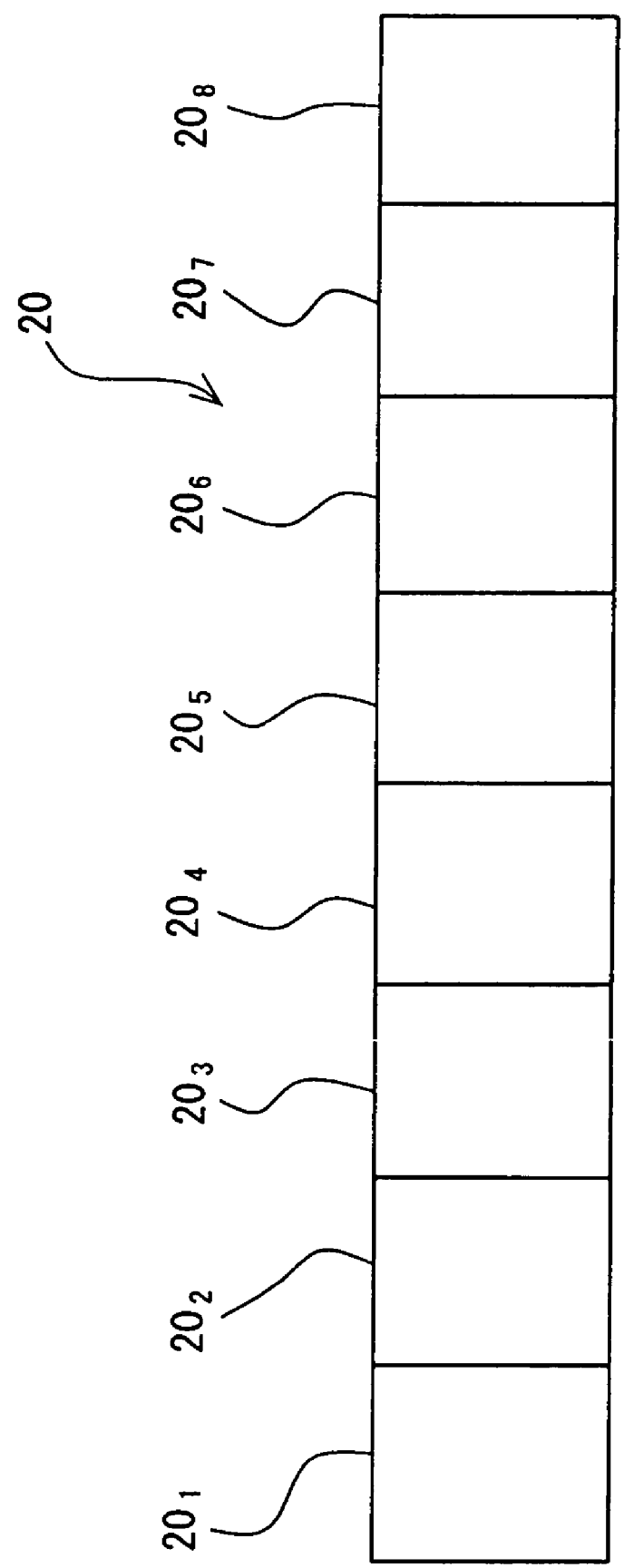
FIG. 4 is a frame format illustrating a configuration of a user's bit area of a time code signal (LTC signal) used in the present invention.

The described renewal frame information Ib and the sequence number information Id are recorded in the user's bit area 20 of the time code signal transmitted by the time code signal transmission apparatus 1. Next, an example of the information to be stored in the user's bit area 20 of the time code signal to be transmitted is described referring to FIG. 4.

The user's bit are 20 comprises first through eighth recording regions $20_1$-$20_8$. The transmission side verification data Dt is stored in the first and second recording regions $20_1$ and $20_2$. The third recording region $20_3$ is a reserve region and not particularly used as a data storage region in the present invention. The sequence number information Id is stored in the fourth recording region $20_4$. The frame rate information $Ic_1$ is stored in the fifth and sixth recording regions $20_5$ and $20_6$. The interlace/progressive discrimination information $Ic_2$ and the discrimination information $Ic_3$ for discriminating the 2:3:2:3 method/2:3:3:2 method in the pull-down processing are stored in the seventh recording region $20_7$. The renewal frame information Ib and other auxiliary information $Ic_3$ are stored in the eighth recording region $20_8$.

Next, an example of a method of calculating the transmission side verification data Dt and the reception side verification data D4 is described.

The data in the first through eighth recording regions $20_1$-$20_8$ constituting the user's bit area 20 of the time code signal to be transmitted is sequentially referred to as a1-a8. The transmission side verification data Dt and the reception side verification data Dr are respectively calculated in the hexadecimal notation according to the following formula.

$$Dt, Dr = ((00h + A34 + A56 + A78) \& FFh) \text{ XOR } 55h \quad 1)$$

$$A34 = (a3 << 4) + a4$$

$$A56 = (a5 << 4) + a6$$

$$A78 = (a7 << 4) + a8$$

XOR: operator for calculating exclusive logical sum
<<: operator for bit-shifting to higher digit
&: operator for calculating logical product
h: numeral value in hexadecimal notation is denoted The recording regions $20_1$ and $20_2$ are the regions for storing the transmission side verification data Dt, and it is not possible to calculate the transmission side verification data Dt and the reception side verification data Dr using the reception side verification data Dr as a variable. Therefore, the variable corresponding to the first and second recording regions $20_1$ and $20_2$ in the formula 1) is 00h.

The transmission side verification data Dt and the reception side verification data Dr are calculated by means of the formula 1), for example, in the following manner. In the case where a1=*, a2=*, a3=C, a4=D, a5=1, a6=2, a7=3, and a8=4, $$Dt, Dr = ((00h + CDh + 12h + 34h) \& FFh) \text{ XOR } 55h$$

$$= 113h \& FFh) \text{ XOR } 55h$$

$$= 46h$$

Next, a method of transmitting the time code signal by means of the time codes signal transmission apparatus 1 according to the present embodiment is described. The description is based on the assumed case where time code signal corresponding to the image signal, in which the 24P image signal is format-converted into the 60I image signal through the primary conversion, is transmitted.

First, the operation conducted by the transmission unit 2 is described. The time code information It created outside of the time code signal transmission apparatus 1 is read by the time code information reading device 4. The read time code information It corresponds to the image signal format-converted into the 60I image signal through the primary conversion. The time code information reading device 4 outputs the read time code information It to the renewal frame information creation device 5, time code auxiliary information creation device 6, and sequence number information creation device 7.

The renewal frame information creation device 5 creates the described renewal frame information Ib from the inputted time code information It, and outputs the renewal frame information Ib to the LTC signal creation device 10 and the transmission side verification data creation device 9.

The time code auxiliary information creation device 6 creates the time code auxiliary information Ic (frame rate information $Ic_1$, interlace/progressive discrimination information $Ic_2$, and other auxiliary information $Ic_3$) from the inputted time code information It, and outputs the time code auxiliary information Ic to the LTC signal creation device 10 and the transmission side verification data creation device 9.

The sequence number information creation device 7 creates the described sequence number information Id from the inputted time code information It, and outputs the sequence number information Id to the LTC signal creation device 10 and the transmission side verification data creation device 9.

The transmission side verification data creation device 9 uses the inputted renewal frame information Ib, time code auxiliary information Ic, and sequence number information Id as verification information, and verify the verification information by means of the predetermined verification formula (an example thereof was described) to thereby create the transmission side verification data Dt. The transmission side verification data creation device 9 outputs the created transmission side verification data Dt to the LTC signal creation device 10.

The LTC signal creation device 10 creates the LTC signal, which is the time code signal, from the inputted time code information It, attached information Ia (renewal frame information Ib, time code auxiliary information Ic, and sequence number information Id), and transmission side verification data Dt. The attached information Ia and the transmission side verification data Dt are stored in the user's bit area 20 of the LTC signal. The form of the storage was already described referring to FIG. 4, therefore not described here.

The LTC signal created in LTC signal creation device 10 is transmitted from the transmission device 11 to the reception unit 3.

Next, the operation conducted by the reception unit 3 is described. First, the LTC signal received by the reception device 12 directly passes through the reception device 12, and is outputted outside from the LTC signal output terminal 17. As a result of the output, the LTC signal is supplied to the information-to-be-verified reading device 13 and verification data reading device 15.

The information-to-be-verified reading device 13 reads the information to be verified from the LTC signal inputted by the reception device 12. The information to be verified is read from the user's bit area 20 per frame of the LTC signal. More specifically, the attached information Ia stored in the user's bit area 20 of each frame of the LTC signal is read as the information to be verified.

The information to be verified read by the information-to-be-verified reading device 13 (attached information Ia) is supplied to the reception side verification data creation device 14. In the reception side verification data creation device 14, the same verification formula as the one used in the transmission side verification data creation device 9 is previously set and memorized. The reception side verification data creation device 14 executes a calculation to the supplied information to be collated (attached information Ia) using the memorized verification formula. The formula 1) described earlier can be mentioned as an example of the verification formula.

The reception side verification data creation device 14 outputs the calculation result to the verification device 16 as the reception side verification data Dr.

Meanwhile, the verification data reading device 15 reads the transmission side verification data Dt from the user's bit area 20 of the LTC signal received by the reception device 12. The reception side verification data Dt is read per frame of the LTC signal. The verification data reading device 15 supplies the read transmission side verification data Dt to the verification device 16.

The verification device 16 collates the reception side verification data Dr supplied by the reception side verification data creation device 14 and the transmission side verification data Dt supplied by the verification data reading device 15 per frame. When the respective data are equal to each other, the verification device 16 judges that there is no error in the information in the user's bit area 20 corresponding to the relevant frame position in the received LTC signal. On the contrary, when the respective data are not equal to each other, the verification device 16 judges the presence of any error in the information in the user's bit area 20 corresponding to the relevant frame position in the received LTC signal. The verification device 16 outputs the error detection result outside of the reception unit 3 from the verification result output terminal 18.

In the time code signal transmission apparatus according to the present embodiment, it is detected from the error detection operation described above whether or not any error is generated in the user's bit area 20 of the LTC signal during the transmission.

In the time code signal transmission apparatus 1, the transmission side verification data Dt and the reception side verification data Dr are verified per frame to thereby identify and detect the error in the user's bit area 20 of the LTC signal per frame. The error detection per frame is particularly effective in the format conversion. In executing the primary conversion, in which the number of the frames is increased or decreased per second, the frame data effective in the secondary conversion is scattered in the frame data constituting the primary conversion image signal. Therefore, the time code signal transmission apparatus 1 capable of detecting the error per frame exerts a remarkable effect particularly in the pursuit for the highly accurate secondary conversion.

In the described embodiment, the sequence number information Id and the renewal frame information Ib are attached to the user's bit area 20 to thereby improve the conversion accuracy in the secondary conversion. However, the same effect can be obtained from attaching only the renewal frame information Ib to the user's bit area 20. In the same manner, the same effect can be obtained from attaching only the sequence number information Id to the user's bit area 20.

Further, the sequence number information Id and the renewal frame information Ib are not necessarily attached to the user's bit area 20, and can be obviously attached to any signal area in the time code signal (LTC signal), to which those information can be attached.

INDUSTRIAL APPLICABILITY

According to the present invention, the relationship between the frame position and the time code can be accurately grasped. Because of the advantage, the highly accurate inverse conversion can be achieved using the information when the inverse conversion (secondary conversion) is executed to the converted image signal.

What is claimed is:

1. A time code signal transmission method for transmitting a time code signal corresponding to an image signal, wherein a format conversion changing the number of frames per second is executed to the image signal, the method comprising the steps of:
    attaching information indicating a frame position where image data is changed in the image signal through the format conversion to the time code signal to be transmitted; and
    transmitting the time code signal attached with the information.

2. The time code signal transmission method as claimed in claim 1, wherein
    the information further indicates a field position where the image data is changed in the image signal through the format conversion.

3. The time code signal transmission method as claimed in claim 1, wherein
    the information is attached to a user bit area of the time code signal.

4. A time code signal transmission method for transmitting a time code signal corresponding to an image signal, wherein a format conversion changing the number of frames per second is executed to the image signal, the method comprising the steps of:
    attaching information indicating a synchronous state between frame conversion cycles in the format conversion and time code progression to the time code signal to be transmitted; and
    transmitting the time code signal attached with the information.

5. The time code signal transmission method as claimed in claim 4, wherein a progressive image signal of 24 frames/second format is converted into a progressive image signal of 30 frames/second format or an interlace image signal of 30 frames/second format in the format conversion.

6. The time code signal transmission method as claimed in claim 4, wherein
    the information is attached to a user bit area of the time code signal.

7. A time code signal transmission apparatus for transmitting a time code signal corresponding to an image signal, wherein a format conversion changing the number of frames per second is executed to the image signal, the apparatus comprising:
    a creation device for creating information indicating a frame position where image data is changed in the image signal through the format conversion is attached to the time code signal to be transmitted;
    an attachment device for attaching the information to the time code signal to be transmitted; and
    an transmitting device for transmitting the time code signal attached with the information.

8. The time code signal transmission apparatus as claimed in claim 7, wherein
    the creation device creates information further indicating a field position where the image data is changed in the image signal through the format conversion as the information.

9. The time code signal transmission apparatus as claimed in claim 7, wherein
    the attachment device attaches the information to a user bit area of the time code signal.

10. A time code signal transmission apparatus for transmitting a time code signal corresponding to an image signal, wherein a format conversion changing the number of frames per second is executed to the image signal, the apparatus comprising:
    a creation device for creating information indicating a synchronous state between frame conversion cycles in the format conversion and time code progression;
    an attachment device for attaching the information to the time code signal to be transmitted in response to the time code progression; and
    an transmitting device for transmitting the time code signal attached with the information.

11. The time code signal transmission apparatus as claimed in claim 10, wherein a progressive image signal of 24 frames/second format is converted into a progressive image signal of 30 frames/second format or an interlace image signal of 30 frames/second format in the format conversion.

12. The time code signal transmission apparatus as claimed in claim 10, wherein the attachment device attaches the information to a user bit area of the time code signal.

13. A format secondary conversion method for an image signal for reconverting a primary-converted image signal converted by a format primary conversion changing the number of frames per second, to an original image signal having an original format through a secondary conversion (inverse conversion), wherein information indicating a frame position where image data is changed through the format primary conversion in the primary-converted image signal, is attached to a time code signal corresponding to the image signal after the format primary conversion, the method comprising the steps of:

reading out the information indicating the frame position from the time code signal in the secondary conversion of the primary-converted image signal, and secondary-converting the primary-converted image signal into the original image signal having the original format based on the information indicating the frame position.

14. The format secondary conversion method for an image signal as claimed in claim 13, wherein the image signal has a plurality of frame image data sequentially disposed in a chronological order, the step of secondary-converting includes an rearrangement processing with respect to the frame image data constituting the primary-converted image signal, and the rearrangement processing with respect to the frame image data constituting the primary-converted image signal is executed based on the information indicating the frame position.

15. The format secondary conversion method for an image signal as claimed in claim 13, wherein the information further indicates a field position where the image data is changed through the fonnat primary conversion in the image signal.

16. The format secondary conversion method for an image signal as claimed in claim 15, wherein the image signal has a plurality of field image data sequentially disposed, the step of secondary-converting includes an rearrangement processing with respect to the field image data constituting the primary-converted image signal, and the rearrangement processing with respect to the field image data constituting the primary-converted image signal is executed based on the information further indicating the field position.

17. A format secondary conversion method for an image signal for reconverting a primary-converted image signal converted by format primary conversion changing the number of frames per second, to an original image signal having an original format through a secondary conversion (inverse conversion), wherein information indicating a synchronous state between frame conversion cycles in the format primary conversion and time code progression is attached to a time code signal corresponding to the image signal after the format primary conversion, the method comprising the steps of:

reading out the information indicating the synchronous state from the time code signal in the secondary conversion of the primary-converted image signal, and secondary-converting the primary-converted image signal into the original image signal having the original format based on the read information.

18. The format secondary conversion method for an image signal as claimed in claim 17, wherein the image signal has a plurality of frame image data sequentially disposed in a chronological order, the step of secondary-converting includes an rearrangement processing with respect to the frame image data constituting the primary-converted image signal, and the rearrangement processing with respect to the frame image data constituting the primary-converted image signal is executed based on the information indicating the synchronous state.

19. The format secondary conversion method for an image signal as claimed in claim 17, wherein the image signal has a plurality of field image data sequentially disposed, the step of secondary-converting includes an rearrangement processing with respect to the field image data constituting the primary-converted image signal, and the rearrangement processing with respect to the field image data constituting the primary-converted image signal is executed based on the information indicating the synchronous state.

20. The format secondary conversion method for an image signal as claimed in claim 17, wherein a progressive image signal of 24 frames/second format is converted into a progressive image signal of 30 frames/second format or an interlace image signal of 30 frames/second format in the format primary conversion.

* * * * *